US010122416B2

(12) United States Patent
Berger et al.

(10) Patent No.: US 10,122,416 B2
(45) Date of Patent: Nov. 6, 2018

(54) INTERFACE FOR TRANSFERRING POWER AND DATA BETWEEN A NON-ROTATING BODY AND A ROTATING BODY (71) Applicant: Panosense, Inc., Menlo Park, CA (US)

(72) Inventors: Adam Berger, Mountain View, CA (US); Brian Pilnick, East Palo Alto, CA (US); Denis Nikitin, Campbell, CA (US)

(73) Assignee: Panosense Inc., Foster City, CA (US)

( * ) Notice: Subject to any disclaimer, the term of this patent is extended or adjusted under 35 U.S.C. 154(b) by 0 days.

(21) Appl. No.: 15/487,044

(22) Filed: Apr. 13, 2017

(65) Prior Publication Data

US 2018/0191404 A1   Jul. 5, 2018

Related U.S. Application Data (60) Provisional application No. 62/440,671, filed on Dec. 30, 2016.

(51) Int. Cl.
*H04B 5/00* (2006.01)
*H04B 10/114* (2013.01)
(Continued)

(52) U.S. Cl.
CPC ......... *H04B 5/0037* (2013.01); *H04B 5/0081* (2013.01); *H04B 10/116* (2013.01);
(Continued)

(58) Field of Classification Search
CPC .............. H04B 5/0037; H04B 5/0081; H04B 10/1143; H04Q 9/00
See application file for complete search history.

(56) References Cited

U.S. PATENT DOCUMENTS 3,790,277 A   2/1974 Hogan
4,154,529 A   5/1979 Dyott
(Continued)

FOREIGN PATENT DOCUMENTS

EP   2410358 A1   1/2012
EP   2858204       4/2015
(Continued)

OTHER PUBLICATIONS

U.S. Appl. No. 14/462,075, filed Aug. 18, 2014, Pennecot et al., "Devices and Methods for a Rotating LIDAR Platform with a Shared Transmit/Receive Path," 55 pages.
(Continued)

*Primary Examiner* — Md Talukder
(74) *Attorney, Agent, or Firm* — Lee & Hayes, PLLC (57) ABSTRACT An interface for transferring power and data between a non-rotating body and a rotating body may include a power transfer device coupled to the non-rotating body, and a power receiver coupled to the rotating body and configured to receive electrical power from the power transfer device. The interface may further include a first data transmitter coupled to the rotating body, and a first data receiver coupled to the non-rotating body and configured to receive data signals from the first data transmitter. The interface may also include a second data transmitter coupled to the non-rotating body, and a second data receiver coupled to the rotating body and configured to receive data signals from the second data transmitter. The wireless coupling between the power transfer device and the power receiver may include an inductive coupling, and the first data transmitter and the first data receiver may each include an optical communication device.

33 Claims, 7 Drawing Sheets (51) Int. Cl.
*H04Q 9/00* (2006.01)
*H04B 10/116* (2013.01)

(52) U.S. Cl.
CPC .......... *H04B 10/1143* (2013.01); *H04Q 9/00* (2013.01); *H04Q 2209/40* (2013.01); *H04Q 2209/88* (2013.01)

(56) References Cited

U.S. PATENT DOCUMENTS

| | | |
|---|---|---|
| 4,516,158 A | 5/1985 | Grainge et al. |
| 4,700,301 A | 10/1987 | Dyke |
| 4,709,195 A | 11/1987 | Hellekson et al. |
| 5,098,185 A | 3/1992 | Watanabe et al. |
| 5,202,742 A | 4/1993 | Frank et al. |
| 5,303,084 A | 4/1994 | Pflibsen et al. |
| 5,337,189 A | 8/1994 | Krawczyk et al. |
| 5,428,438 A | 6/1995 | Komine |
| 5,703,351 A | 12/1997 | Meyers |
| 6,046,800 A | 4/2000 | Ohtomo et al. |
| 6,115,128 A | 9/2000 | Vann |
| 6,778,732 B1 | 8/2004 | Fermann |
| 7,089,114 B1 | 8/2006 | Huang |
| 7,248,342 B1 | 7/2007 | Degnan |
| 7,255,275 B2 | 8/2007 | Gurevich et al. |
| 7,259,838 B2 | 8/2007 | Carlhoff et al. |
| 7,311,000 B2 | 12/2007 | Smith et al. |
| 7,361,948 B2 | 4/2008 | Hirano et al. |
| 7,417,716 B2 | 8/2008 | Nagasaka et al. |
| 7,544,945 B2 | 6/2009 | Tan et al. |
| 7,969,558 B2 | 6/2011 | Hall |
| 8,050,863 B2 | 11/2011 | Trepagnier et al. |
| 8,477,290 B2 | 7/2013 | Yamada |
| 8,675,181 B2 | 3/2014 | Hall |
| 8,742,325 B1 | 6/2014 | Droz et al. |
| 8,767,190 B2 | 7/2014 | Hall |
| 8,836,922 B1 | 9/2014 | Pennecot et al. |
| 9,069,060 B1 | 6/2015 | Zbrozek et al. |
| 9,086,273 B1 | 7/2015 | Gruver et al. |
| 9,285,464 B2 | 3/2016 | Pennecot et al. |
| 9,299,731 B1 | 3/2016 | Lenius et al. |
| 9,368,936 B1 | 6/2016 | Lenius et al. |
| 9,529,079 B1 | 12/2016 | Droz et al. |
| RE46,672 E | 1/2018 | Hall |
| 2002/0140924 A1* | 10/2002 | Wangler .............. G01S 7/4802 356/28 |
| 2005/0124310 A1 | 6/2005 | Yamamoto et al. |
| 2008/0316463 A1 | 12/2008 | Okada et al. |
| 2010/0110006 A1 | 5/2010 | Lee et al. |
| 2010/0220141 A1 | 9/2010 | Ozawa |
| 2010/0302528 A1 | 12/2010 | Hall |
| 2011/0216304 A1 | 9/2011 | Hall |
| 2011/0255070 A1 | 10/2011 | Phillips et al. |
| 2012/0274147 A1 | 11/2012 | Stecher et al. |
| 2014/0274216 A1 | 9/2014 | Olodort |
| 2014/0295755 A1 | 10/2014 | Graf |
| 2015/0055117 A1* | 2/2015 | Pennecot ................ G01S 17/89 356/4.01 |
| 2015/0091374 A1* | 4/2015 | Lenius .................... H02J 17/00 307/9.1 |
| 2015/0193934 A1 | 7/2015 | Fuchikami et al. |
| 2015/0293228 A1 | 10/2015 | Retterath et al. |
| 2016/0047901 A1 | 2/2016 | Pacala et al. |
| 2016/0274221 A1 | 9/2016 | Wu et al. |
| 2016/0380487 A1* | 12/2016 | Widmer .................. H02J 50/12 324/654 |
| 2017/0176576 A1* | 6/2017 | Kotelnikov ............. G01S 17/89 |
| 2017/0350967 A1* | 12/2017 | Wilton ................... G01S 17/10 |

FOREIGN PATENT DOCUMENTS

| | | |
|---|---|---|
| WO | WO03073123 | 9/2003 |
| WO | WO2012172526 A1 | 12/2012 |

OTHER PUBLICATIONS

Efficient Power Conversion, Why GaN circuits make better Lidar, retrieved on Mar. 3, 2017 at <<http://epc-co.com/epc/DesignSupport/TrainingVideos/eGaNDemos/GaN-circuits-make-better-LiDAR.aspx>> 2 pages.
Notice of Allowance from the U.S. Patent and Trademark Office for U.S. Appl. No. 14/462,075, dated Nov. 18, 2015. 8 pages.
Office Action from the U.S. Patent and Trademark Office for U.S. Appl. No. 14/462,075, dated Jun. 17, 2015. 14 pages.
The PCT Search Report and Written Opinion dated Nov. 19, 2014 for PCT Application No. PCT/US2014/047864, 12 pages.
Rim et al., "The optical advantages of curved focal plane arrays," Optics Express, vol. 16, No. 7, Mar. 31, 2008, 1 page.
Xu et al., "A calibration method of the multi-channel imaging lidar," Proceedings SPIE 9080, Laser Radar Technology and Applications XIX; and Atmospheric Propagation XI, 90800V, Jun. 9, 2014, 2 pages.
Office Action for U.S. Appl. No. 15/706,413, dated Mar. 16, 2018, Franz, "Interface for Transferring Data Between a Non-Rotating Body and a Rotating Body", 11 pages.
The PCT Invitation to Pay Additional Fees mailed Mar. 12, 2018 for PCT application No. PCT/US2017/067553, 16 pages.
The PCT Search Report and Written Opinion dated May 7, 2018, for PCT Application No. PCT/US17/67553, 19 pages.

* cited by examiner

INTERFACE FOR TRANSFERRING POWER AND DATA BETWEEN A NON-ROTATING BODY AND A ROTATING BODY

RELATED APPLICATIONS

This application claims priority to U.S. Provisional Application No. 62/440,671, filed Dec. 30, 2016, which is incorporated herein by reference.

BACKGROUND

There are circumstances under which it would be beneficial to transfer electric power and data between a non-rotating body and a rotating body. For example, if the rotating body includes electronic devices that require electric power for operation, it may be beneficial to transfer electric power from a non-rotating body coupled to an electric power source to the rotating body. In addition, if the electronic devices included in the rotating body generate data signals, it may be beneficial to transfer the data signals from the electronic devices associated with the rotating body to a non-rotating body. However, rotation of the rotating body may prevent the use of hard-wired connections between the rotating body and the non-rotating body.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

As discussed above, it may be beneficial to transfer electric power and data between a non-rotating body and a rotating body. For example, if the rotating body includes electronic devices that require electric power for operation, it may be beneficial to transfer electric power from a non-rotating body coupled to an electric power source to the rotating body. In addition, if the electronic devices included in the rotating body generate data signals, it may be beneficial to transfer the data signals from the electronic devices associated with the rotating body to a non-rotating body. However, rotation of the rotating body may prevent the use of hard-wired connections between the rotating body and the non-rotating body.

For example, a rotating body may include one or more sensors generating data signals in the form of sensor signals. Operation of the one or more sensors may require electrical power, and thus, it may be necessary to transfer electrical power from a non-rotating body coupled to an electrical power source to the one or more sensors carried by the rotating body. In addition, it may be beneficial to control the electrical power transferred to the rotating body in order to provide appropriate power characteristics for the one or more sensors and any other electrically powered devices carried by the rotating body. It may also be beneficial to transfer the sensor signals generated by the one or more sensors to a location remote from the rotating body, such as to a non-rotating body. In addition, for some applications, it may be beneficial to prevent interference from altering or corrupting the power and sensor signals as they are transferred between the non-rotating body and the rotating body.

The disclosure is generally directed to an interface for transferring power and data between a non-rotating body and a rotating body. For example, some examples of an interface may transfer electrical power from the non-rotating body to a rotating body. For example, the non-rotating body may be electrically coupled to an electrical power source, and the interface may transfer the electrical power from the power source to the rotating body. Some examples of the interface may transfer data signals from the rotating body to the non-rotating body. For example, the rotating body may carry one or more sensors configured to generate sensor signals, and the interface may transfer the sensor signals in the form of data signals from the rotating body to the non-rotating body. Some examples of the interface may transfer data signals from the non-rotating body to the rotating body. For example, the data signals may be used for controlling characteristics of the electrical power used by the one or more sensors and other electrically-powered devices carried by the rotating body. In some examples, the transfer of the electrical power and/or the data signals between the non-rotating body and the rotating body may be resistant to alteration or corruption from interference.

In some examples, the interface may be used with a vehicle to provide the transfer of electrical power and data signals between the vehicle and one or more sensors carried by a rotating body. For example, the interface may be configured to be coupled to a non-rotating body coupled to the vehicle and the rotating body. The interface may be configured to transfer electrical power to the one or more sensors and other electrically-powered devices carried by the rotating body. The interface may be configured to transfer sensor signals in the form of data signals from the one or more sensors carried by the rotating body to the non-rotating body, for example, so that a controller of the vehicle may incorporate the sensor signals into a strategy for controlling an aspect of operation of the vehicle.

In some examples, an interface may be provided for transferring power and data between a non-rotating body and a rotating body having an axis of rotation. The interface may include a power transfer device coupled to the non-rotating body and configured to transfer electrical power, and a power receiver coupled to the rotating body and configured to receive electrical power from the power transfer device via a wireless coupling. The interface may further include a first data transmitter coupled to the rotating body and configured to transmit data signals, and a first data receiver coupled to the non-rotating body and configured to receive data signals from the first data transmitter via a wireless coupling. The interface may also include a second data transmitter coupled to the non-rotating body and configured to transmit data signals, and a second data receiver coupled to the rotating body and configured to receive data signals from the second data transmitter via a wireless coupling. The wireless coupling between the power transfer device and the power receiver may include an inductive coupling. The first data transmitter and the first data receiver may each include an optical communication device, and the wireless coupling between the first data transmitter and the first data receiver may include an optical coupling. For example, the optical coupling may be a free-space optical coupling.

In some examples, the power transfer device and the power receiver may each include an inductive coil. In some examples, the power transfer device and the power receiver may be axially aligned with the axis of rotation of the rotating body. In some examples, the first data transmitter and the first data receiver may be axially aligned with the axis of rotation of the rotating body.

In some examples, the wireless coupling between the second data transmitter and the second data receiver may include an inductive coupling. In some examples, the second data transmitter and the second data receiver may each include an inductive coil. In some examples, the second data transmitter and the second data receiver may be axially aligned with the axis of rotation of the rotating body.

In some examples, the first data transmitter, the first data receiver, the second data transmitter, and the second data receiver may each include an optical communication device. The wireless coupling between the first data transmitter and the first data receiver may include an optical coupling, and the wireless coupling between the second data transmitter and the second data receiver may include an optical coupling. In some examples, the optical couplings may be free-space optical couplings. In some examples, the first data transmitter and the second data transmitter may be axially aligned with the axis of rotation of the rotating body, and the first data receiver and the second data receiver may be axially offset from the axis of rotation of the rotating body. In other examples, the first data receiver and the second data receiver may be axially aligned with the axis of rotation of the rotating body, and the first data transmitter and the second data transmitter may be axially offset from the axis of rotation of the rotating body.

In some examples, the first data transmitter may be configured to send data signals relating to sensor data from the rotating body to the first data receiver. In some examples, the second data transmitter may be configured to send data signals for regulating power to the second data receiver. In some examples, the second data transmitter may be configured to send data signals for controlling operation of the rotating body to the second data receiver.

In some examples, the rotating body may be substantially cylindrical, and the non-rotating body may be a substantially planar surface. In some examples, the first data transmitter and the first data receiver may be configured to provide uni-directional data transfer, and the second data transmitter and the second data receiver may be configured to provide bi-directional data transfer.

In some examples, an interface may be provided for transferring power and data between a non-rotating body and a rotating body having an axis of rotation. The interface may include a power transfer device coupled to the non-rotating body and configured to transfer electrical power, and a power receiver coupled to the rotating body and configured to receive electrical power from the power transfer device via a wireless coupling. The interface may also include a first data transmitter coupled to the rotating body and configured to transmit data signals, and a first data receiver coupled to the non-rotating body and configured to receive data signals from the first data transmitter via a wireless coupling. The first data transmitter and the first data receiver may each include an optical communication device, and the wireless coupling between the first data transmitter and the first data receiver may include an optical coupling. For example, the optical coupling may be a free-space optical coupling. The wireless coupling between the power transfer device and the power receiver may include an inductive coupling. In some examples, the power transfer device and the power receiver may each include an inductive coil. The first data transmitter may be configured to send data signals relating to sensor data from the rotating body to the first data receiver.

In some examples, the interface may also include a second data transmitter coupled to the non-rotating body and configured to transmit data signals, and a second data receiver coupled to the rotating body and configured to receive data signals from the second data transmitter via a wireless coupling. For example, the second data transmitter may be configured to send data signals for regulating power to the second data receiver. In some examples, the second data transmitter may be configured to send data signals for controlling operation of the rotating body to the second data receiver.

In some examples, the wireless coupling between the second data transmitter and the second data receiver may include an inductive coupling. In some examples, the second data transmitter and the second data receiver may each include an inductive coil, and the second data transmitter and the second data receiver may be axially aligned with the axis of rotation of the rotating body.

In some examples, the first data transmitter, the first data receiver, the second data transmitter, and the second data receiver may each include an optical communication device. The wireless coupling between the first data transmitter and the first data receiver may include an optical coupling, and the wireless coupling between the second data transmitter and the second data receiver may include an optical coupling. In some examples, the optical couplings may be free-space optical couplings.

In some examples, a sensor assembly may include a rotating body including at least one sensor configured to generate sensor data signals obtained during rotation of the rotating body. The sensor assembly may also include a non-rotating body associated with the rotating body, such that the rotating body rotates about an axis of rotation that passes through the non-rotating body. In some examples, the rotating body may be configured to rotate through an angle of 360 degrees or more in either direction about its axis of rotation, and in some examples, the rotating body may be configured to rotate through and angle of less than 360 degrees and reverse its direction of rotation about its axis of rotation. In some examples, the sensor assembly may also include an interface for transferring power and data between the non-rotating body and the rotating body. The interface may include a power transfer device coupled to the non-rotating body and configured to transfer electrical power, and a power receiver coupled to the rotating body and configured to receive electrical power from the power transfer device via a wireless coupling. The interface may also include a first data transmitter coupled to the rotating body and configured to transmit data signals, and a first data receiver coupled to the non-rotating body and configured to receive data signals from the first data transmitter via a wireless coupling. The wireless coupling between the power transfer device and the power receiver may include an inductive coupling. In some examples, the power transfer device and the power receiver may each include an inductive coil. The first data transmitter may be configured to send data signals relating to sensor data from the rotating body to the first data receiver. The interface may include any of the interfaces disclosed herein.

In some examples, the at least one sensor may include a light detection and ranging (LIDAR) sensor. Other types of sensors are contemplated. In some examples, the interface may be configured to supply electrical power to the at least one sensor and at least partially control operation of the at least one sensor. In some examples, the sensor assembly may include a housing associated with the rotating body and configured to protect the at least one sensor. In some examples, the housing may include a lens configured to provide an optical path from the at least one sensor to the surroundings.

In some examples, non-rotating body may define a substantially planar surface, and the axis of rotation of the rotating body may be substantially perpendicular to the planar surface (e.g., the axis of rotation of the rotating body may be perpendicular to the planar surface within technical tolerances). In some examples, the axis of rotation of the rotating body may be orthogonal to the planar surface. In some examples, the non-rotating body and the rotating body may be coupled to one another.

The techniques and systems described herein may be implemented in a number of ways. Example implementations are provided below with reference to the figures. While certain examples are described herein in the context of a LIDAR sensor, in other examples, the techniques may be applied to transfer data and/or power between stationary (i.e., non-rotating) and rotating components.

Figure 1A:
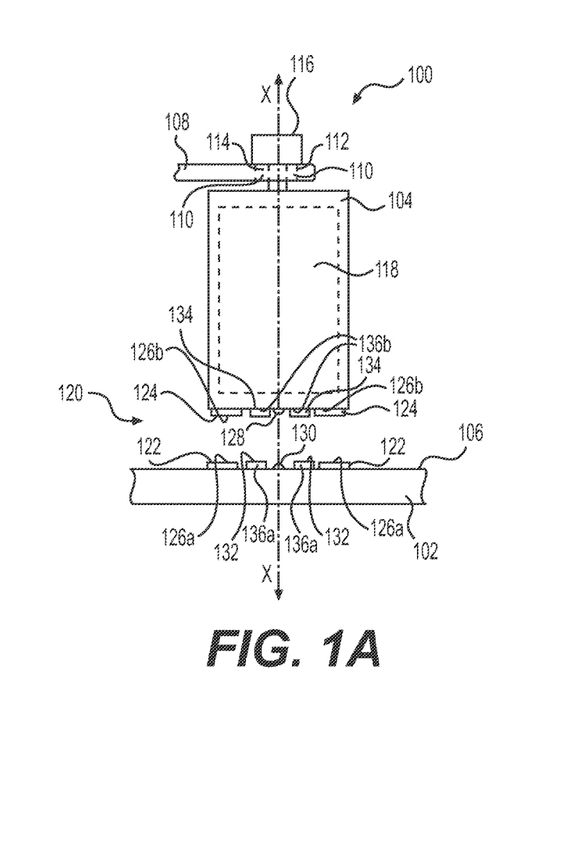
FIG. 1A is a partial schematic side view of an example non-rotating body, an example rotating body, and an example interface for transferring power and data between the non-rotating body and the rotating body.

FIG. 1A is a schematic side view of an example assembly 100 including a non-rotating body 102 and a rotating body 104. In the example shown, the non-rotating body 102 is associated with the rotating body 104, such that the rotating body 104 rotates about an axis of rotation X that passes through the non-rotating body 102. In some examples, the rotating body 104 may be configured to rotate through an angle of 360 degrees or more in either direction about its axis of rotation X, and in some examples, the rotating body 104 may be configured to rotate through an angle of less than 360 degrees and reverse its direction of rotation about its axis of rotation X For example, the rotating body 104 may be configured to oscillate about its axis X without completing a 360-degree rotation.

In some examples, the non-rotating body 102 may define a substantially planar surface 106, and the axis of rotation X of the rotating body 104 may be substantially perpendicular to the planar surface 106, for example, such that the axis of rotation X of the rotating body 104 may be substantially perpendicular to the planar surface 106 within technical tolerances. In some examples, the rotating body 104 may be substantially cylindrical. In some examples, the axis of rotation X of the rotating body 104 may be orthogonal to the planar surface 106. In some examples, the non-rotating body 102 and the rotating body 104 may be coupled to one another. In some examples, the non-rotating body 102 may be coupled to the rotating body 104, for example, such that the non-rotating body 102 at least partially supports the rotating body 104.

In the example shown in FIG. 1A, the assembly 100 includes a support 108 configured to at least partially support the rotating body 104, such that the rotating body 104 is able to rotate about its axis of rotation X. For example, a bearing 110 may be provided in a bore 112 of the support 108, and a shaft 114 may extend through the bearing 110 and be coupled to the rotating body 104. The example shown includes a motor 116 (e.g., an electric motor) coupled to the shaft 114 and configured to apply torque to the shaft 114 to rotate the rotating body about the axis X. Other arrangements are contemplated. For example, the motor 116 may be located remotely from the shaft 114, and torque from the motor 116 may be provided by a device for transmitting torque from the motor 116 to the shaft 114, such as, for example, one or more gears, one or more shafts, one or more belts, and/or one or more chain drives. In some examples, the motor 116 may be located between the support 108 and the rotating body 104. In some examples, the motor 116 may be located at the other end of the rotating body 104, for example, between the non-rotating body 102 and the rotating body 104, or on the opposite side of the non-rotating body 102 from the rotating body 104. In some examples, the non-rotating body 102 may include a bore and/or a bearing therein (not shown in FIG. 1A) (e.g., similar to the bearing 110 associated with the support 108), and may at least partially support the rotating body 104, such that it may rotate about the axis X of the rotating body 104.

In some examples, the rotating body 104 may be associated with one or more electronic devices 118. For example, the electronic devices 118 may be carried by or within the rotating body 104. The electronic devices 118 may include any devices that use electrical power to perform functions, such as, for example, sensors configured to generate sensor signals in the form of data signals, processors configured to manipulate the data signals (e.g., processors that filter, compress, and/or transform the data signals), and/or controllers to control operation of the sensors and/or the rotating body 104. Other types and functions of electronic devices 118 are contemplated.

The example assembly 100 shown in FIG. 1A also includes an interface 120 for transferring power and data between the non-rotating body 102 and the rotating body 104. The example interface 120 shown in FIGS. 1A-1C includes a power transfer device 122 associated with (e.g., coupled to) the non-rotating body 102 and configured to transfer electrical power. In the example shown, the power transfer device 122 is coupled to the planar surface 106 of the non-rotating body 102. The example interface 120 also includes a power receiver 124 associated with (e.g., coupled to) the rotating body 104 and configured to receive electrical power from the power transfer device 122 via a wireless coupling. In some examples, the wireless coupling between the power transfer device 122 and the power receiver 124 may include an inductive coupling. In the example shown, the power receiver 124 is associated with the end of the rotating body 104 facing the planar surface 106. In the example shown, the power transfer device 122 and the power receiver 124 may each include an inductive coil 126a and 126b, respectively. In such examples, the power is transferred from the inductive coil 126a to the inductive coil 126b by electrical induction. In some examples, for example as shown, the power transfer device 122 and the power receiver 124 are axially aligned with the axis X of rotation of the rotating body 104. In some examples, the power transfer device 122 and the power receiver 124 may be configured to transfer electrical power ranging from about 15 watts to about 60 watts, or from about 20 watts to about 50 watts, or from about 30 watts to about 40 watts.

Although the inductive coupling shown in FIGS. 1A-2C includes inductive coils 126a and 126b, other forms of inductive couplings are contemplated, such as, for example, near-field power transfer devices and far-field power transfer devices. In some examples, the inductive coupling may include resonant inductive coupling, non-resonant inductive coupling, capacitive coupling, resonant capacitive coupling, magnetodynamic coupling, a rotary transformer, and/or coupling via radio waves, microwaves, and/or light waves.

Figure 1B:
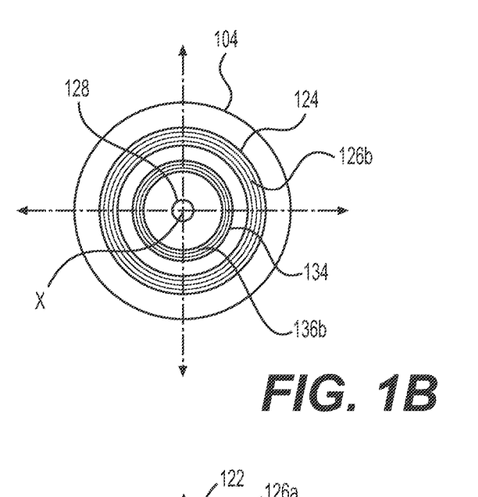
FIG. 1B is a schematic bottom view of the example rotating body and a portion of the example interface shown in FIG. 1A.
Figure 1C:
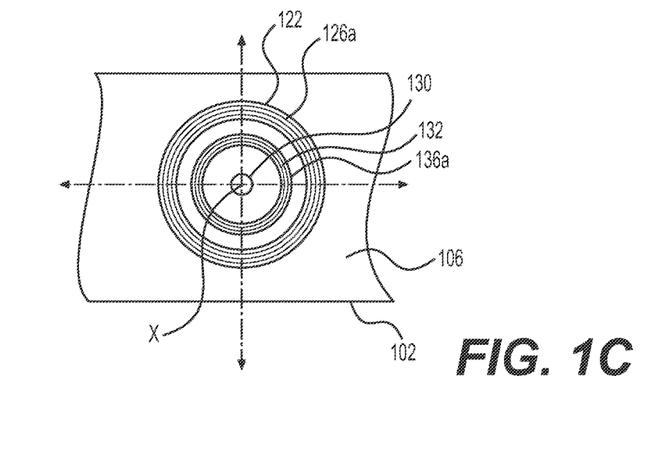
FIG. 1C is a partial schematic top view of the example non-rotating body and a portion of the example interface shown in FIG. 1A.

The example interface 120 shown in FIGS. 1A-1C also includes a first data transmitter 128 associated with (e.g., coupled to) the rotating body 104 and configured to transmit data signals, and a first data receiver 130 associated with (e.g., coupled to) the non-rotating body 102 and configured to receive data signals from the first data transmitter 128 via a wireless coupling. In the example shown, the first data transmitter 128 is associated with the end of the rotating body 104 facing the planar surface 106, and the first data receiver 130 is coupled to the planar surface 106. The first data transmitter 128 may be configured to send data signals (e.g., sensor data and/or other data signals) from the rotating body 104 to the first data receiver 130, which is associated with the non-rotating body 102. In some examples, the first data transmitter 128 and the first data receiver 130 may be configured to provide uni-directional data transfer. In some examples, the first data transmitter 128 and the first data receiver 130 may be configured to wirelessly transfer data signals via a high-speed wireless link (e.g., a wireless link having a data transfer rate of greater than or equal to 50 kilobits per second (kbps)). For example, the first data transmitter 128 and the first data receiver 130 may each include an optical communication device and the wireless coupling between the first data transmitter 128 and the first data receiver 130 provides an optical coupling. For example, the optical coupling may be a free-space optical coupling. In some examples, the first data transmitter 128 may include an optical transmitter, such as, for example, a light-emitting diode (LED) or a laser diode, and the first data receiver 130 may include an optical receiver, such as, for example, a photo detector. In some examples, for example as shown in FIG. 1A, the first data transmitter 128 and the first data receiver 130 are axially aligned with the axis of rotation X of the rotating body 104. In some examples, the first data transmitter 128 and the first data receiver 130 may be transceivers configured to both transmit data and receive data, such as, for example, transceivers that include photodiodes configured to operate in both transmitting and receiving modes, rendering them bi-directional. In some examples, the optical transmission may include visible light and/or invisible light (e.g., infrared light). Other types of high-speed wireless links are contemplated.

In the examples shown in FIGS. 1A-1C and 2A-2C, the interface 120 also includes a second data transmitter 132 coupled to the non-rotating body 102 and configured to transmit data signals, and a second data receiver 134 coupled to the rotating body 104 and configured to receive data signals from the second data transmitter 132 via a wireless coupling. In some examples, the second data transmitter 132 is configured to send data signals for regulating power supplied to the electronic devices 118 to the second data receiver 134. In some examples, the second data transmitter 132 is configured to send data signals for controlling operation of the rotating body 104 to the second data receiver 134, such as, for example, control signals related controlling rotation of the rotating body 104, such as, for example, how fast and/or what direction the rotating body 104 should rotate.

In some examples, the second data transmitter 132 and the second data receiver 134 may be configured to provide bi-directional data transfer. For example, the second data transmitter 132 may be configured to receive data, and the second data receiver 134 may be configured to transmit data, thus reversing functions. In some examples, both the second data transmitter 132 and the second data receiver 134 may be configured to send and receive data. In some examples, the second data transmitter 132 and the second data receiver 134 may be configured to wirelessly transfer data signals via a low-speed wireless link (e.g., a wireless link having a data transfer rate of less than 20 kbps). In some examples, the second data transmitter 132 and the second data receiver 134 may be configured to wirelessly transfer data signals via a medium-speed wireless link (e.g., a wireless link having a data transfer rate ranging from about 25 kbps to about 30 kbps (e.g., about 28 kbps)). For example, as shown in FIGS. 1A-1C, the second data transmitter 132 and the second data receiver 134 each include an inductive coil 136a and 136b, respectively, and the wireless coupling between the second data transmitter 132 and the second data receiver 134 provides an inductive coupling. In the example shown, the second data transmitter 132 and the second data receiver 134 are axially aligned with the axis of rotation X of the rotating body 104. Other types of low-speed and medium-speed wireless links are contemplated. For example, other types of inductive couplings are contemplated, such as those previously mentioned.

Figure 2A:
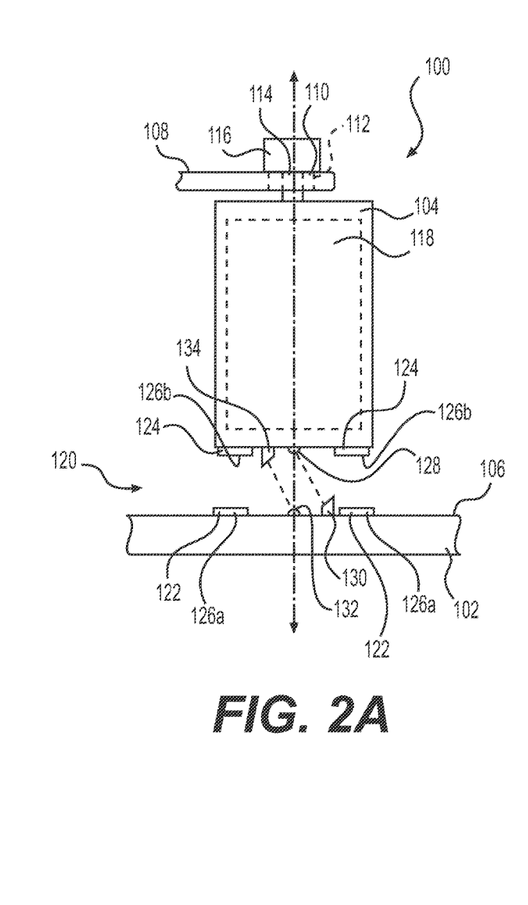
FIG. 2A is a partial schematic side view of an example non-rotating body, an example rotating body, and another example interface for transferring power and data between the non-rotating body and the rotating body.
Figure 2B:
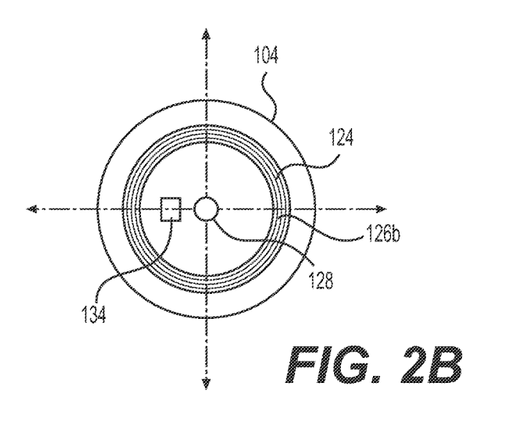
FIG. 2B is a schematic bottom view of the example rotating body and a portion of the example interface shown in FIG. 2A.
Figure 2C:
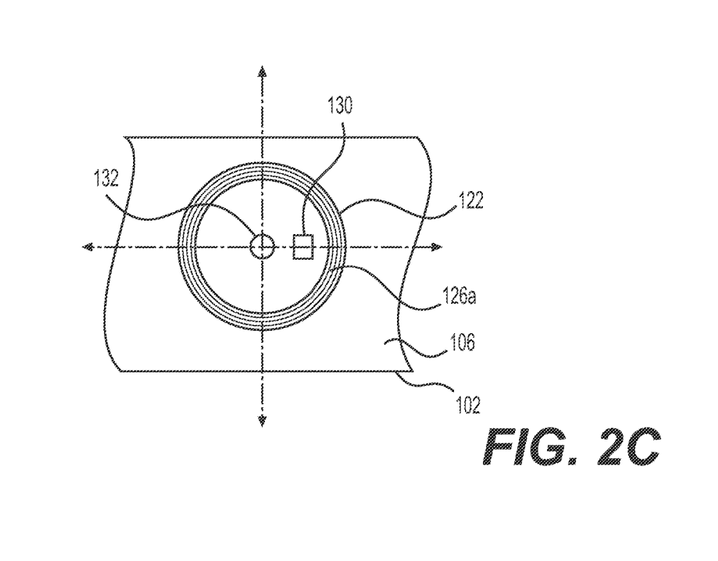
FIG. 2C is a partial schematic top view of the example non-rotating body and a portion of the example interface shown in FIG. 2A.

In some examples, the first data transmitter 128, the first data receiver 130, the second data transmitter 132, and the second data receiver 134 may be configured to wirelessly transfer data signals via a high-speed wireless link. For example, as shown in FIGS. 2A-2C, the first data transmitter 128, the first data receiver 130, the second data transmitter 132, and the second data receiver 134 each include an optical communication device, the wireless coupling between the first data transmitter 128 and the first data receiver 130 provides an optical coupling, and the wireless coupling between the second data transmitter 132 and the second data receiver 134 provides an optical coupling. For example, the optical coupling may be a free-space optical coupling. In some examples, the first data transmitter 128 and the second data transmitter 132 may each include an optical transmitter, such as, for example, an LED or a laser diode, and the first data receiver 130 and the second data receiver 134 may each include an optical receiver, such as, for example, a photo detector. In some examples, the first data transmitter 128, the first data receiver 130 may be configured to provide uni-directional data transfer, and the second data transmitter 132 and the second data receiver 134 may be configured to provide uni-directional data transfer. In some examples, the first data transmitter 128, the first data receiver 130, the second data transmitter 132, and the second data receiver 134 may be transceivers configured to both transmit data and receive data, such as, for example, transceivers that include photodiodes configured to operate in both transmitting and receiving modes, rendering them bi-directional.

In the example shown in FIGS. 2A-2C, the first data transmitter 128 and the second data transmitter 132 are positioned along the axis of rotation X of the rotating body 104, and the first data receiver 130 and the second data receiver 134 are axially offset from the axis of rotation X of the rotating body 104. As shown, the first data transmitter 128 is associated with the rotating body 104, such that it is located on the axis of rotation X, and the first data receiver 130 is associated with the planar surface 106 of the non-rotating body 102, such that it is not located on the axis of rotation X. However, the first data receiver 130, which is stationary, is oriented such that it receives the data signals (e.g., optical data signals) from the first data transmitter 128 as the first data transmitter 128 rotates with the rotating body 104. The second data receiver 134, which revolves about and is spaced from the axis X of the rotating body 104 as the rotating body 104 rotates, is oriented such that it receives the data signals (e.g., optical data signals) from the second data transmitter 132, which is stationary. In some examples, one or more of the first data transmitter 128, the first data receiver 130, the second data transmitter 132, and the second data receiver 134 may be supplemented with reflectors and/or lenses to assist with maintaining the communication link between the first data transmitter 128 and the first data receiver 130, and/or the communication link the between the second data transmitter 132 and the second data receiver 134. In some examples, cross-talk or interference between the first data transmitter 128 and the first data receiver 130 pair, and the second data transmitter 132 and the second data receiver 134 pair, may be mitigated or eliminated via, for example, time sharing techniques and/or by use of bandpass filtering and differences in the communication signals of the pairs (e.g., different frequencies and/or wavelengths of the signals between the pairs). Other techniques are contemplated. In some examples, the first data receiver 130 and the second data receiver 134 are axially aligned with the axis of rotation X of the rotating body 104, and the first data transmitter 128 and the second data transmitter 132 are axially offset from the axis of rotation X of the rotating body 104.

In some examples, the interface 120 may be resistant to interference with the power transfer and/or the data transfer that might otherwise alter, corrupt, or block the power and/or data transfer. This may be beneficial when the interface 120 is used in association with devices or machines for which interruption of the power and/or data transfer may be particularly undesirable. For example, in machines that operate with little or no human control, interruption of the transfer of power and/or data to a part of the machine may contribute to the occurrence of an accident. For example, for an autonomous vehicle having little or no human control, sensors may be used to assist with guidance and/or object avoidance. If data signals from those sensors are interrupted, for example, via a loss of power used to operate the sensors and/or corruption or interruption of the data signals generated by the sensors and used by the vehicle as part of a vehicle control strategy, such occurrences may increase the likelihood of an accident. Thus, in such uses it may be beneficial for the interface to be resistant to interference with the power transfer and/or the data transfer that might otherwise alter, corrupt, or block the power and/or data transfer, regardless of whether such interference is accidental or intentional.

The example assemblies 100 shown in FIGS. 1A-2C may be incorporated into a sensor assembly. For example, FIGS. 3-7 schematically depict an example sensor assembly 300 configured to generate sensor data in the form of data signals, and transmit the data signals from the sensor assembly 300 to one or more processors for use of the data signals.

The example sensor assembly 300 shown in FIGS. 3-7 includes light detection and ranging (LIDAR) sensors configured to sense objects in an environment surrounding the sensor assembly 300. In some examples, a LIDAR sensor emits pulses of laser light and estimates to the distance between the sensor and an object in the environment surrounding the sensor based on the time for a reflected return light signal to reach the sensor. The example sensor assembly 300 shown in FIGS. 3-7 may include different or additional types of sensors. In some examples, the laser light may include visible light and/or invisible light (e.g., infrared light). In some examples, the optical transmission and the laser light may be at different frequencies or wavelengths, for example, to avoid interference between the sensing and the data transmission.

As shown in FIGS. 3-7, the example sensor assembly 300 includes a spine 302 configured to couple the sensor assembly 300 to a platform, such as, for example, a vehicle for which the sensor signals may be used.

Figure 3:
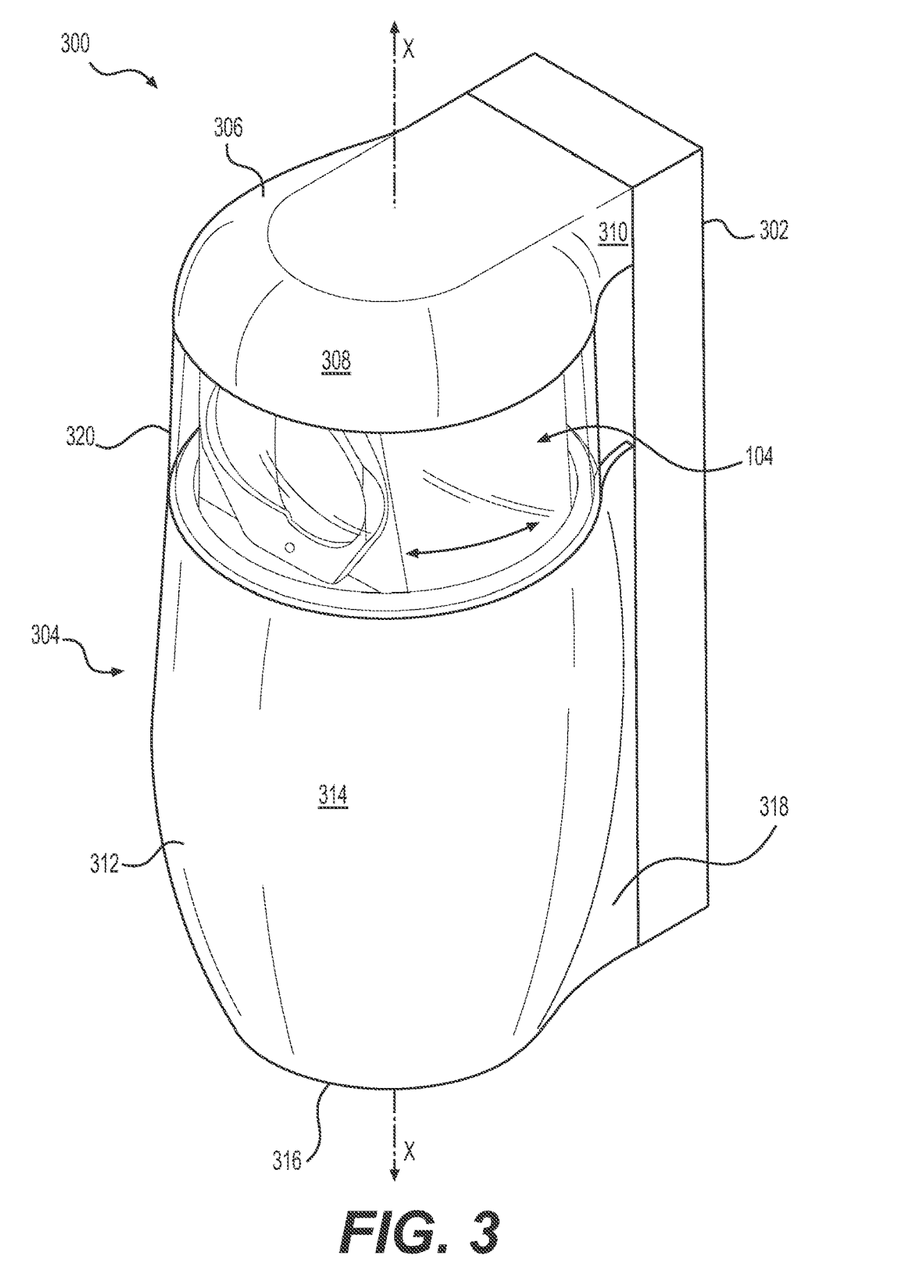
FIG. 3 is a schematic perspective view of an example sensor assembly.

In some examples, referring to FIG. 3, the sensor assembly 300 may include a protective casing 304 providing a housing configured to protect the sensor assembly 300 from environmental elements and/or provide a specified design appearance. In some examples, the protective casing 304 may be substantially cylindrical. As shown in FIG. 3, the example protective casing 304 includes a first shell portion 306 coupled to the support 108 and/or the spine 302 (see FIG. 4). The example first shell portion 306 includes a hat-shaped portion 308 configured to cover an upper end (i.e., in the orientation depicted) of the rotating body 104 of the sensor assembly 300, and an extension 310 configured to extend to the spine 302. The example protective casing 304 also includes a second shell portion 312 coupled to a third support 700 (see FIG. 7) and/or the spine 302. The example second shell portion 312 includes a hollow cylindrical portion 314 having a closed end 316 and an open side 318 configured to fit around the rotating body 104 of the sensor assembly 300. The example protective casing 304 also includes a lens 320 coupled to the spine 302 and the first and second shell portions 306 and 312. The example lens 320 is ring-shaped and facilitates the passage of light to and from the sensor assembly 300 as the rotating body 104 of the sensor assembly 300 rotates within the protective casing 304. One or more O-rings (not shown) may be provided between the first shell portion 306 and the lens 320, and/or between the lens 320 and the second shell portion 312, where the first shell portion 306, the lens 320, and the second shell portion 312 meet one another in order to prevent dirt and moisture from entering the protective casing 304. Gaskets and/or sealants may be provided between one or more of the first shell portion 306, the lens 320, and the second shell portion 312, and the spine 302 in order to prevent dirt and moisture from entering the protective casing 304.

Figure 4:
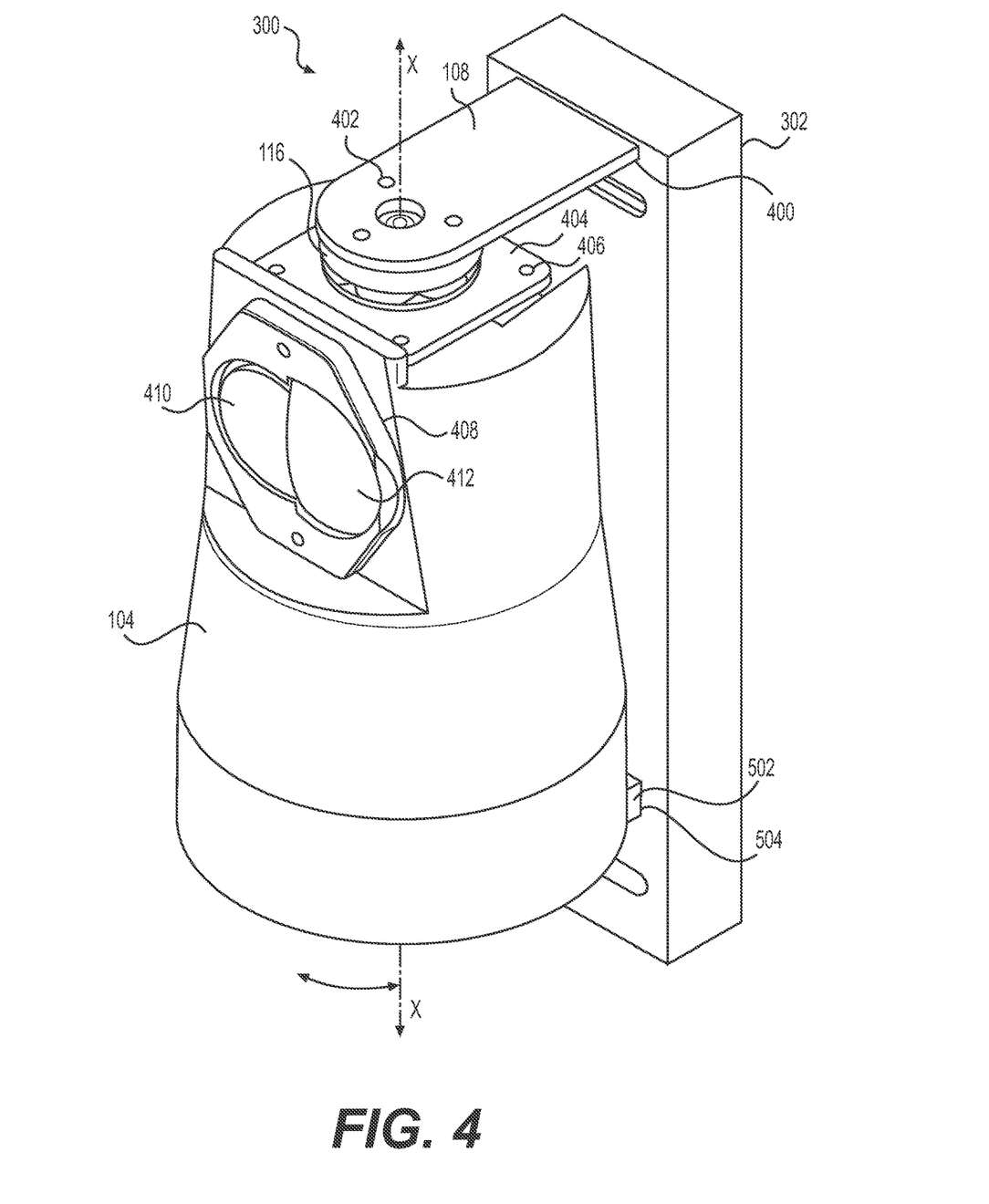
FIG. 4 is a schematic perspective view of a portion of the example sensor assembly shown in FIG. 3.

As shown in FIG. 4, the sensor assembly also includes a support 108 coupled to the spine 302, for example, in a cantilever configuration. In some examples, the support 108 and the spine 302 may be integrally formed via, for example, a single piece of material, thereby coupling the support 108 and the spine 302 to one another. In some examples, the spine 302 may include a slot 400 in which an end of the support 108 is received. Fasteners, welds, and/or adhesives may be used to secure the support 108 in the slot 400. The example sensor assembly 300 also includes a motor 116 coupled to the support 108, for example, via one or more fasteners 402. The motor 116, in turn, is coupled to a rotating body 104 of the sensor assembly 300 via a coupler 404 and one or more fasteners 406. The coupler 404 is configured to transfer torque from the motor 116 to the rotating body 104, so that the rotating body 104 rotates about its axis of rotation X.

In the example sensor assembly 300 shown, the rotating body 104 body serves as a substantially hollow housing for carrying electronic devices including components of the LIDAR sensors. For example, the rotating body 104 may carry one or more of laser boards 500 (see FIG. 5) configured to emit laser light, a detector board (not shown) for detecting the return laser signals reflected from an object in the environment surrounding the sensor assembly 300, and one or more reflectors (not shown) configured to deflect the emitted laser light and/or the return signals, and electronic circuitry (not shown) to provide electrical power and control for operation of the sensor assembly 300. In addition, the example sensor assembly 300 also includes a lens housing 408 configured to couple two lenses 410 and 412 to the rotating body 104. The lenses 410 and 412 are configured to focus the emitted laser light and the return signals for detecting objects in the environment surrounding the sensor assembly 300.

Figure 5:
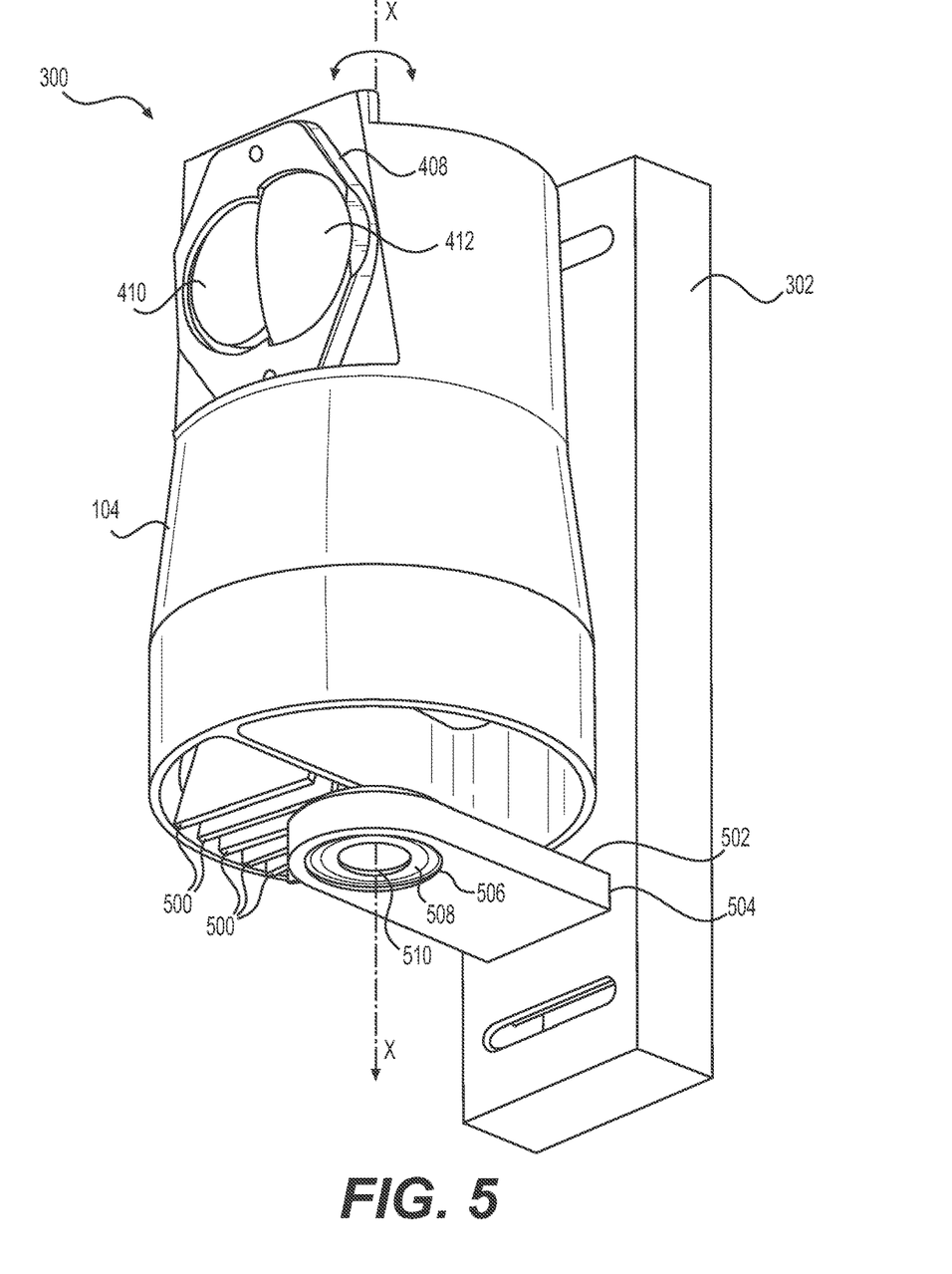
FIG. 5 is a schematic perspective view of a portion of the example sensor assembly shown in FIG. 3 shown from a different angle.

As shown in FIG. 5, the example sensor assembly 300 also includes a second support 502 coupled to the spine 302, for example, in a cantilever manner. In some examples, the second support 502 and the spine 302 may be integrally formed via, for example, a single piece of material, thereby coupling the second support 502 and the spine 302 to one another. In some examples, the spine 302 includes a second slot 504 in which the second support 502 is received. Fasteners, welds, and/or adhesives may be used to secure the second support 502 in the second slot 504. The example second support 502 may include a bore 506 receiving a bearing 508, and the rotating body 104 may include a stub 510 coupled to the bearing 508, such that the stub 510 and the rotating body 104 rotate with the bearing 508. In the example shown, the support 108, the bearing 110, the motor 116, the second support 502, and bearing 508 facilitate rotation of the rotating body 104 about the axis of rotation X. As a result of this example configuration, the laser light emitted from the sensor assembly 300 may be directed through a 360-degree sweep of the surrounding environment for detection of objects in the surrounding environment (not including the portion of the 360-degrees blocked by the spine 302).

Figure 6:
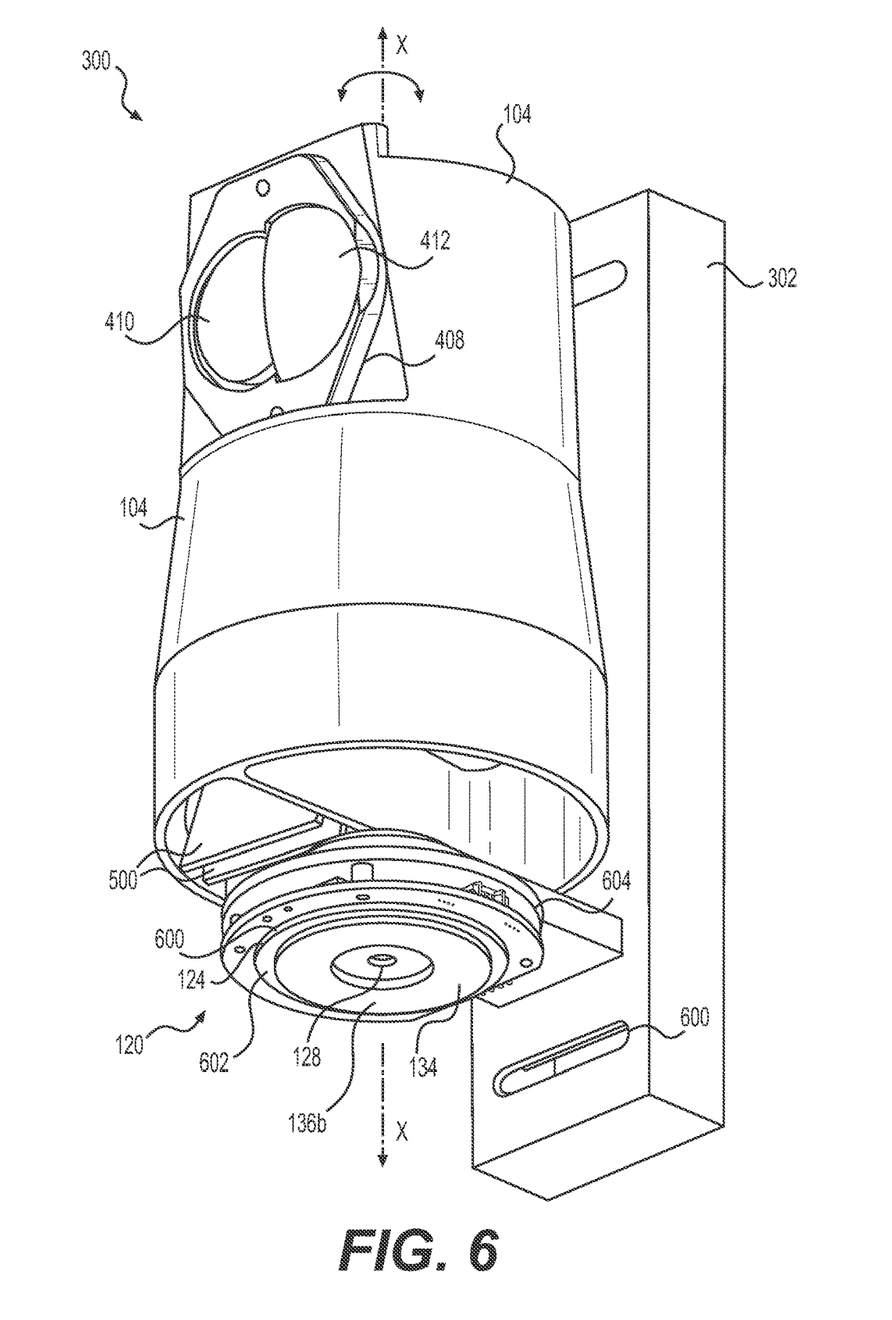
FIG. 6 is a schematic perspective view of a portion of the example sensor assembly shown in FIG. 3, including a portion of an example interface, shown from the same angle as FIG. 5.
Figure 7:
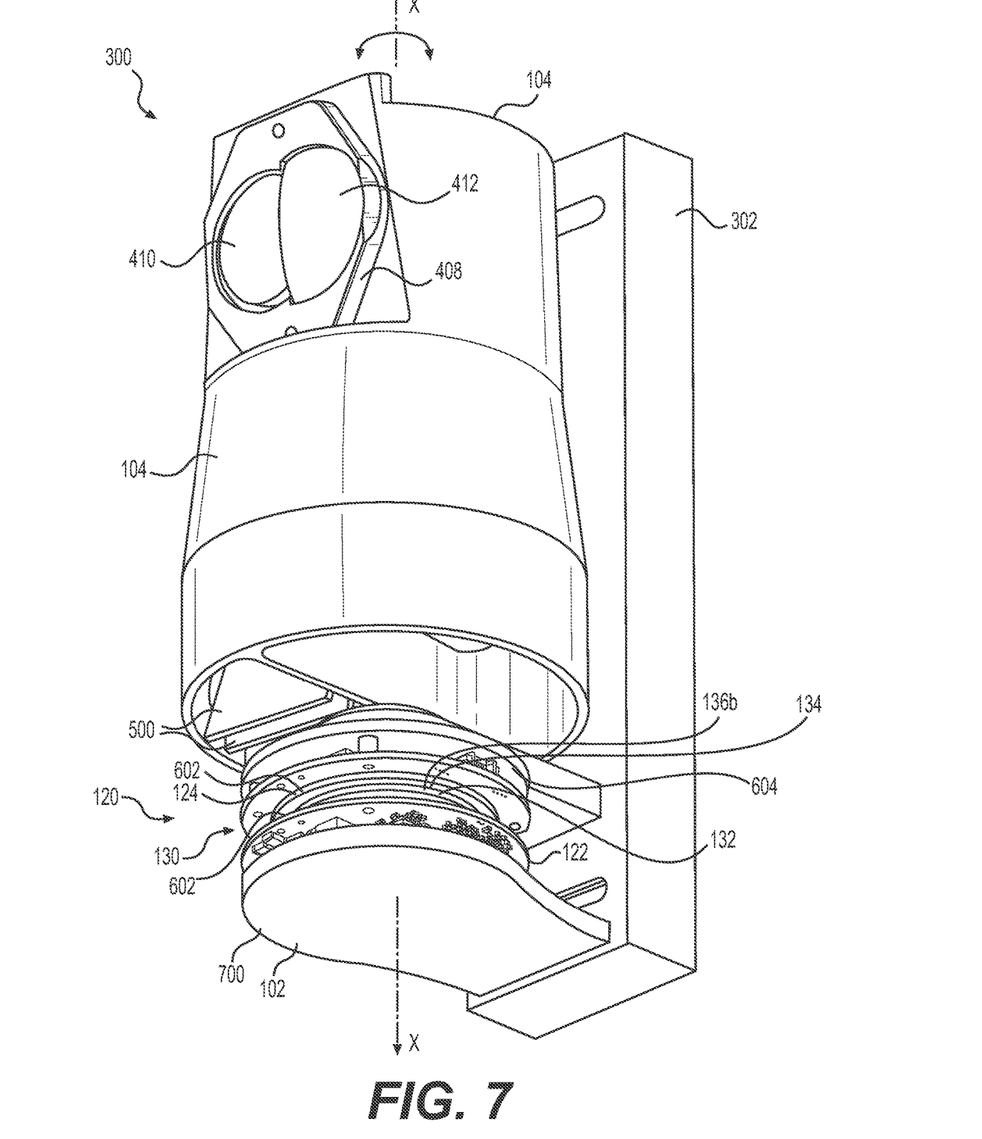
FIG. 7 is a schematic perspective view of a portion of the example sensor assembly shown in FIG. 3, including the example interface shown from the same angle as FIG. 5.

As shown in FIGS. 6 and 7, the example sensor assembly 300 includes an interface 120 for transferring power and data between a non-rotating body 102 and the rotating body 104. For example, as shown in FIG. 7, the example sensor assembly 300 includes a non-rotating body 102 in the form of the third support 700 coupled to the spine 302, for example, in a cantilever manner. For example, the spine 302 includes a third slot 600 (see FIG. 6), in which the third support 700 is received. Fasteners, welds, and/or adhesives may be used to secure the third support 700 in the third slot 600. The spine 302 may be coupled to, for example, a vehicle that uses the sensor assembly 300 to detect objects surrounding the vehicle. For example, the spine 302 and/or the third support 700 may provide a conduit for routing fiber optics, wires, and/or cables between the third support 700 and control and/or power systems of the vehicle. In some examples, a power system of the vehicle may supply electric power to the wires and/or cables received by the spine 302 and/or the third support 700. In some examples, a control system of the vehicle may provide control signals to the fiber optics, wires, and/or cables received by the spine 302 and/or the third support 700. In some examples, the data signals received by the fiber optics, wires, and/or cables of the third support 700 from the rotating body 104, may be supplied to the control systems of the vehicle by the fiber optics, wires, and/or cables. In this example manner, electrical power may be supplied via fiber optics, wires, and/or cables of the third support 700, data signals may be supplied from the vehicle to the third support 700, and/or data signals from the rotating body 104 of the sensor assembly 300 may be supplied via the third support 700 to the control systems of the vehicle.

As shown in FIGS. 6 and 7, the example interface 120 includes a power transfer device 122 coupled to the third support 700 (see FIG. 7) and configured to transfer electrical power, and a power receiver 124 (see FIGS. 6 and 7) coupled to the rotating body 104 and configured to receive electrical power from the power transfer device 122 via a wireless coupling. The example interface 120 also includes a first data transmitter 128 (FIG. 6) coupled to the rotating body 104 of the sensor assembly 300 and configured to transmit data signals, and a first data receiver 130 (see FIG. 7) coupled to the third support 700 and configured to receive data signals from the first data transmitter 128 via a wireless coupling.

In the example shown in FIGS. 6 and 7, the power transfer device 122 and the power receiver 124 each include an inductive coil 602, and the wireless coupling between the power transfer device 122 and the power receiver 124 provides an inductive coupling. In some examples, the power receiver 124 is coupled to the rotating body 104 of the sensor assembly 300 by a coupling plate 604, for example, as shown in FIGS. 6 and 7. The example coupling plate 604 may be coupled to the bearing 508 associated with the second support 502, for example, so that the coupling plate 604 is on a side of the second support 502 opposite the rotating body 104 of the sensor assembly 300, with the power receiver 124 being on a side of the coupling plate 604 opposite the second support 502, for example, as shown in FIG. 6.

In the example shown, the power transfer device 122 and the power receiver 124 are axially aligned with the axis of rotation X of the rotating body 104, and thus, the respective inductive coils 602 of the power transfer device 122 and the power receiver 124 are axially aligned with one another. The example power transfer device 122 and the power receiver 124 also include electronic circuitry, for example, in the form of programmable circuit boards, configured to control operation of the inductive coils 602. In this example configuration, electrical power may be transmitted wirelessly via induction from a power source associated with the vehicle to the electrically powered devices carried by the rotating body 102. In some examples, the power transfer device 122 and the power receiver 124 may be a near-field transfer device. In some examples, the power transfer device 122 and the power receiver 124 may be configured to transfer electrical power ranging from about 15 watts to about 60 watts, or from about 20 watts to about 50 watts, or from about 30 watts to about 40 watts.

The example first data transmitter 128 shown in FIG. 6 is configured to send data signals relating to sensor data from the rotating body 104 of the sensor assembly 300 to the first data receiver 130 (see FIG. 7). For example, sensor signals in the form of data signals from the LIDAR sensors may be wirelessly transmitted by the first data transmitter 128 to the first data receiver 130, so that the data signals may be transmitted from the sensor assembly 300 to one or more controllers of the vehicle. In some examples, the first data transmitter 128 and the first data receiver 130 may be configured to wirelessly transfer data signals via a high-speed wireless link (e.g., a wireless link having a data transfer rate of greater than or equal to 50 kbps). In some examples, the first data transmitter 128 and the first data receiver 130 may be configured to provide uni-directional data transfer. In some examples, the first data transmitter 128 and the first data receiver 130 may each include an optical communication device, and the wireless coupling between the first data transmitter 128 and the first data receiver 130 provides an optical coupling. For example, the optical coupling may be a free-space optical coupling. In some examples, the first data transmitter 128 may include an optical transmitter, such as, for example, an LED or a laser diode, and the first data receiver 130 may include an optical receiver, such as, for example, a photo detector. In some examples, the first data transmitter 128 and the first data receiver 130 are axially aligned with the axis of rotation X of the rotating body 104. In this example configuration, data signals may be transmitted wirelessly from the LIDAR sensors and electronics carried by the rotating body 104 of the sensor assembly 300 to one or more controllers associated with the vehicle. In some examples, the first data transmitter 128 and the first data receiver 130 may be transceivers configured to both transmit data and receive data, such as, for example, transceivers that include photodiodes configured to operate in both transmitting and receiving modes, rendering them bi-directional. In some examples, the optical transmission may include visible light and/or invisible light (e.g., infrared light). Other types of high-speed wireless links are contemplated.

The example interface 120 also includes a second data transmitter 132 (not shown in FIGS. 6 and 7; see, e.g., FIGS. 1A-1C and 2A-2C) coupled to the third support 700 and configured to transmit data signals, and a second data receiver 134 coupled to the rotating body 104 of the sensor assembly 300 and configured to receive data signals from the second data transmitter 132 via a wireless coupling. In some examples, the second data transmitter 132 is configured to send data signals for regulating power supplied to the electronic devices including components of the LIDAR sensors carried by the rotating body 104 to the second data receiver 134. In some examples, the second data transmitter 132 is configured to send data signals for controlling operation of the rotating body 104 of the sensor assembly 300 to the second data receiver 134, such as, for example, control signals related to controlling rotation of the rotating body 104 of the sensor assembly 300 via control of the motor 116.

In some examples, the second data transmitter 132 and the second data receiver 134 may be configured to provide bi-directional data transfer. For example, the second data transmitter 132 may be configured to receive data, and the second data receiver 134 may be configured to transmit data, thus reversing functions. In some examples, both the second data transmitter 132 and the second data receiver 134 may be configured to send and receive data. In some examples, the second data transmitter 132 and the second data receiver 134 may be configured to wirelessly transfer data signals via a low-speed wireless link (e.g., a wireless link having a data transfer rate of less than 20 kbps. In some examples, the second data transmitter 132 and the second data receiver 134 may be configured to wirelessly transfer data signals via a medium-speed wireless link (e.g., a wireless link having a data transfer rate ranging from about 25 kbps to about 30 kbps (e.g., about 28 kbps)). In some examples, for example as shown in FIG. 7, the second data transmitter 132 and the second data receiver 134 each include an inductive coil (e.g., inductive coils 136a and 136b shown in FIGS. 1A-1C), respectively, and the wireless coupling between the second data transmitter 132 and the second data receiver 134 provides an inductive coupling. In the example shown, the second data transmitter 132 and the second data receiver 134 are axially aligned with the axis of rotation X of the rotating body 104. Other types of low-speed wireless links are contemplated.

In some examples, the first data transmitter 128, the first data receiver 130, the second data transmitter 132, and the second data receiver 134 may be configured to wirelessly transfer data signals via a high-speed wireless link. For example, as shown schematically in FIGS. 2A-2C, the first data transmitter 128, the first data receiver 130, the second data transmitter 132, and the second data receiver 134 may each include an optical communication device, the wireless coupling between the first data transmitter 128 and the first data receiver 130 provides an optical coupling, and the wireless coupling between the second data transmitter 132 and the second data receiver 134 provides an optical coupling. In some examples, the optical couplings may be free-space optical couplings. In some examples, the first data transmitter 128 and the second data transmitter 132 may each include an optical transmitter, such as, for example, an LED or a laser diode, and the first data receiver 130 and the second data receiver 134 may each include an optical receiver, such as, for example, a photo detector. In some examples, the first data transmitter 128, the first data receiver 130 may be configured to provide uni-directional data transfer, and the second data transmitter 132 and the second data receiver 134 may be configured to provide uni-directional data transfer.

In some examples of the sensor assembly 300, the respective inductive coils 136a and 136b of the second data transmitter 132 and the second data receiver 134 of the sensor assembly 300 may be replaced by respective optical communication devices, for example, as shown in FIGS. 2A-2C. In such examples, the first data transmitter 128 and the second data transmitter 132 are axially aligned with the axis of rotation X of the rotating body 104 of the sensor assembly 300, and the first data receiver 130 and the second data receiver 134 are axially offset from the axis of rotation X of the rotating body 104. For example, as shown in FIGS. 2A-2C, the first data transmitter 128 is associated with the rotating body 104, such that it is located on the axis of rotation X, and the first data receiver 130 is associated with the third support 700, such that it is not located on the axis of rotation X. However, the first data receiver 130, which is stationary, is oriented such that it receives the data signals (e.g., optical data signals) from the first data transmitter 128 as the first data transmitter 128 rotates with the rotating body 104 of the sensor assembly 300. The second data receiver 134, which revolves about and is spaced from the axis X of the rotating body 104 as the rotating body 104 rotates, is oriented such that it receives the data signals (e.g., optical data signals) from the second data transmitter 132, which is stationary. In some examples, one or more of the first data transmitter 128, the first data receiver 130, the second data transmitter 132, and the second data receiver 134 may be supplemented with reflectors and/or lenses to assist with maintaining the communication link between the first data transmitter 128 and the first data receiver 130, and/or the communication link the between the second data transmitter 132 and the second data receiver 134. In some examples, cross-talk or interference between the first data transmitter 128 and the first data receiver 130 pair, and the second data transmitter 132 and the second data receiver 134 pair, may be mitigated or eliminated via, for example, time sharing techniques and/or by use of bandpass filtering and differences in the communication signals of the pairs (e.g., different frequencies and/or wavelengths of the signals between the pairs). Other techniques are contemplated. In some examples, the first data receiver 130 and the second data receiver 134 are axially aligned with the axis of rotation X of the rotating body 104 of the sensor assembly 300, and the first data transmitter 128 and the second data transmitter 132 are axially offset from the axis of rotation X of the rotating body 104.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. An interface for transferring power and data between a non-rotating body and a rotating body having an axis of rotation, the interface comprising:
    a power transfer device coupled to the non-rotating body and configured to transfer electrical power;
    a power receiver coupled to the rotating body and configured to receive electrical power from the power transfer device via a wireless coupling;
    a first data transmitter coupled to the rotating body and configured to transmit data signals;
    a first data receiver coupled to the non-rotating body and configured to receive data signals from the first data transmitter via a wireless coupling;
    a second data transmitter coupled to the non-rotating body and configured to transmit data signals; and
    a second data receiver coupled to the rotating body and configured to receive data signals from the second data transmitter via a wireless coupling,
    wherein the wireless coupling between the power transfer device and the power receiver comprises an inductive coupling,
    wherein the first data transmitter and the first data receiver each comprise an optical communication device, and the wireless coupling between the first data transmitter and the first data receiver comprises an optical coupling, and
    wherein the first data transmitter and the first data receiver are axially aligned with the axis of rotation of the rotating body.

2. The interface of claim 1, wherein the power transfer device and the power receiver each comprise an inductive coil, and wherein the power transfer device and the power receiver are axially aligned with the axis of rotation of the rotating body.

3. The interface of claim 1, wherein the second data transmitter and the second data receiver each comprise an inductive coil, and the wireless coupling between the second data transmitter and the second data receiver comprises an inductive coupling.

4. The interface of claim 3, wherein the second data transmitter and the second data receiver are axially aligned with the axis of rotation of the rotating body.

5. The interface of claim 1, wherein the first data transmitter is configured to send data signals relating to sensor data from the rotating body to the first data receiver.

6. The interface of claim 1, wherein the second data transmitter is configured to send data signals for regulating power to the second data receiver.

7. The interface of claim 1, wherein the second data transmitter is configured to send data signals for controlling operation of the rotating body to the second data receiver.

8. The interface of claim 1, wherein the rotating body is substantially cylindrical and the non-rotating body comprises a substantially planar surface.

9. The interface of claim 1, wherein the first data transmitter and the first data receiver are configured to provide uni-directional data transfer, and wherein the second data transmitter and the second data receiver are configured to provide bi-directional data transfer.

10. An interface for transferring power and data between a non-rotating body and a rotating body having an axis of rotation, the interface comprising:
    a power transfer device coupled to the non-rotating body and configured to transfer electrical power;
    a power receiver coupled to the rotating body and configured to receive electrical power from the power transfer device via a wireless coupling;
    a first data transmitter coupled to the rotating body and configured to transmit data signals;
    a first data receiver coupled to the non-rotating body and configured to receive data signals from the first data transmitter via a wireless coupling;
    a second data transmitter coupled to one of the non-rotating body or the rotating body; and a second data receiver coupled to one of the non-rotating body or the rotating body,
    wherein the wireless coupling between the power transfer device and the power receiver comprises an inductive coupling,
    wherein the first data transmitter is configured to send data signals relating to sensor data from the rotating body to the first data receiver via an optical coupling, and
    wherein the first data transmitter and the first data receiver are axially aligned with the axis of rotation of the rotating body.

11. The interface of claim 10, wherein the first data transmitter and the first data receiver each comprise an optical communication device.

12. The interface of claim 10, wherein the power transfer device and the power receiver each comprise an inductive coil, and wherein the power transfer device and the power receiver are axially aligned with the axis of rotation of the rotating body.

13. The interface of claim 10, further comprising:
    wherein the second data transmitter is coupled to the non-rotating body and configured to transmit data signals, and
    wherein the second data receiver is coupled to the rotating body and configured to receive data signals from the second data transmitter via a wireless coupling.

14. The interface of claim 13, wherein the second data transmitter is configured to send data signals for regulating power to the second data receiver.

15. The interface of claim 13, wherein the second data transmitter is configured to send data signals for controlling operation of the rotating body to the second data receiver.

16. The interface of claim 13, wherein the second data transmitter and the second data receiver each comprise an inductive coil, and the wireless coupling between the second data transmitter and the second data receiver comprises an inductive coupling.

17. The interface of claim 16, wherein the second data transmitter and the second data receiver are axially aligned with the axis of rotation of the rotating body.

18. The interface of claim 10, wherein the rotating body is substantially cylindrical, and the non-rotating body comprises a substantially planar surface.

19. The interface of claim 10, further comprising:
wherein the second data transmitter is coupled to the non-rotating body and configured to transmit data signals, and
wherein the second data receiver is coupled to the rotating body and configured to receive data signals from the second data transmitter via a wireless coupling,
wherein the first data transmitter and the first data receiver are configured to provide uni-directional data transfer, and
wherein the second data transmitter and the second data receiver are configured to provide bi-directional data transfer.

20. A sensor assembly comprising:
a rotating body comprising at least one sensor configured to generate sensor data signals obtained during rotation of the rotating body;
a non-rotating body associated with the rotating body such that the rotating body rotates about an axis of rotation that passes through the non-rotating body; and
an interface for transferring power and data between the non-rotating body and the rotating body, the interface comprising:
a power transfer device coupled to the non-rotating body and configured to transfer electrical power;
a power receiver coupled to the rotating body and configured to receive electrical power from the power transfer device via a wireless coupling;
a first data transmitter coupled to the rotating body and configured to transmit data signals;
a first data receiver coupled to the non-rotating body and configured to receive data signals from the first data transmitter via a wireless optical coupling;
a second data transmitter coupled to one of the non-rotating body or the rotating body; and
a second data receiver coupled to one of the non-rotating body or the rotating body,
wherein the wireless coupling between the power transfer device and the power receiver comprises an inductive coupling,
wherein the first data transmitter is configured to send data signals relating to sensor data from the rotating body to the first data receiver, and
wherein the first data transmitter and the first data receiver are axially aligned with the axis of rotation of the rotating body.

21. The sensor assembly of claim 20, wherein the at least one sensor comprises a light detection and ranging (LIDAR) sensor.

22. The sensor assembly of claim 20, wherein the interface is configured to supply electrical power to the at least one sensor and at least partially control operation of the at least one sensor.

23. The sensor assembly of claim 20, further comprising a housing associated with the rotating body and configured to protect the at least one sensor.

24. The sensor assembly of claim 23, wherein the housing comprises a lens configured to provide an optical path from the at least one sensor to the surroundings.

25. The sensor assembly of claim 20, wherein the non-rotating body defines a substantially planar surface, and wherein the axis of rotation of the rotating body is substantially perpendicular to the planar surface.

26. The sensor assembly of claim 20, wherein the non-rotating body and the rotating body are coupled to one another.

27. The sensor assembly of claim 20, wherein the power transfer device and the power receiver each comprise an inductive coil, and wherein the power transfer device and the power receiver are axially aligned with the axis of rotation of the rotating body.

28. The sensor assembly of claim 20, wherein the first data transmitter and the first data receiver each comprise an optical communication device.

29. The sensor assembly of claim 20, further comprising:
wherein the second data transmitter is coupled to the non-rotating body and configured to transmit data signals, and
wherein the second data receiver is coupled to the rotating body and configured to receive data signals from the second data transmitter via a wireless coupling.

30. The sensor assembly of claim 29, wherein the second data transmitter is configured to send data signals for regulating power to the second data receiver.

31. The sensor assembly of claim 29, wherein the second data transmitter is configured to send data signals for controlling operation of the rotating body to the second data receiver.

32. The sensor assembly of claim 20, wherein the second data transmitter and the second data receiver each comprise an inductive coil, and the wireless coupling between the second data transmitter and the second data receiver comprises an inductive coupling.

33. The sensor assembly of claim 32, wherein the second data transmitter and the second data receiver are axially aligned with the axis of rotation of the rotating body.

* * * * *